US012729558B2

(12) United States Patent
Choi et al.

(10) Patent No.: US 12,729,558 B2
(45) Date of Patent: Sep. 8, 2026

(54) ABOVE-GROUND ASH INTERMENT SYSTEM

(71) Applicant: ZINNIA IP NOMINEE PTY LTD, Sydney (AU)

(72) Inventors: John Choi, Manly (AU); Phillip Coxall, Sydney (AU); Graeme MacDonald, Watsons Bay (AU)

(73) Assignee: ZINNIA IP NOMINEE PTY LTD, Sydney (AU)

( * ) Notice: Subject to any disclaimer, the term of this patent is extended or adjusted under 35 U.S.C. 154(b) by 208 days.

(21) Appl. No.: 18/283,866

(22) PCT Filed: Mar. 25, 2022

(86) PCT No.: PCT/AU2022/050274

§ 371 (c)(1),
(2) Date: Sep. 25, 2023

(87) PCT Pub. No.: WO2022/198280

PCT Pub. Date: Sep. 29, 2022

(65) Prior Publication Data

US 2024/0295135 A1 Sep. 5, 2024

(30) Foreign Application Priority Data

Mar. 26, 2021 (AU) ................................ 2021900911

(51) Int. Cl.
*E04H 13/00* (2006.01)
*A61G 17/08* (2006.01)

(52) U.S. Cl.
CPC ........... *E04H 13/008* (2013.01); *A61G 17/08* (2013.01)

(58) Field of Classification Search
CPC ..... E04H 13/008; E04H 13/006; A61G 17/08; A61G 17/0076
See application file for complete search history.

(56) References Cited

U.S. PATENT DOCUMENTS 3,254,773 A * 6/1966 Diem .................... E04H 13/006 211/85.27
3,529,730 A * 9/1970 Thompson ............ E04H 13/006 211/1

(Continued)

FOREIGN PATENT DOCUMENTS

AT 8819 U1 * 1/2007
CZ 32251 U1 10/2018

(Continued)

OTHER PUBLICATIONS

Australian Examination Report No. 1 from AU Application No. 2022242178, mailed on Sep. 27, 2024, 7 pages.

(Continued)

*Primary Examiner* — William L Miller
(74) *Attorney, Agent, or Firm* — Kagan Binder, PLLC

(57) ABSTRACT

A device and a method for storing and memorializing biological remains are disclosed. The device comprises at least one elongated support member, and a plurality of containers, each container adapted to individually engage with said elongated support member while storing said biological remains, wherein upon said engagement, each container is securely engaged with said elongated support member to form an array of containers along said elongated support member.

16 Claims, 10 Drawing Sheets

(56) References Cited

U.S. PATENT DOCUMENTS

| | | | | |
|---|---|---|---|---|
| 3,754,805 A | | 8/1973 | Pangburn et al. | |
| 3,925,944 A | * | 12/1975 | Pickel | E04H 13/006 52/133 |
| 4,328,606 A | * | 5/1982 | Nunes | A61G 17/007 27/35 |
| 4,607,417 A | | 8/1986 | Hancovsky | |
| 4,669,157 A | | 6/1987 | Schwarten | |
| 4,688,359 A | | 8/1987 | See | |
| 5,344,028 A | | 9/1994 | Angele | |
| 5,370,242 A | * | 12/1994 | Huang | A47B 81/068 211/59.4 |
| 5,560,499 A | | 10/1996 | Dardashti | |
| 5,577,620 A | * | 11/1996 | Jacob | A47B 81/068 312/9.9 |
| 5,903,961 A | * | 5/1999 | Parker | A61G 17/007 27/1 |
| 5,931,315 A | | 8/1999 | Lorentz et al. | |
| 5,984,115 A | * | 11/1999 | Koestenblatt | G11B 33/0472 211/49.1 |
| 6,055,793 A | * | 5/2000 | Irwin | A61G 17/08 53/436 |
| 6,161,268 A | | 12/2000 | Joseph | |
| 6,295,705 B1 | * | 10/2001 | Gersten | A61G 17/08 220/4.27 |
| 6,493,911 B1 | * | 12/2002 | Troin | E04H 13/008 125/20 |
| 6,520,606 B1 | * | 2/2003 | Robinson | E04H 13/008 27/1 |
| 6,944,921 B1 | * | 9/2005 | Gersten | E04H 13/008 27/1 |
| 7,096,546 B2 | * | 8/2006 | Poirier | A61G 17/08 27/1 |
| 9,051,752 B1 | * | 6/2015 | Muthusami | E04H 13/006 |
| 10,688,005 B2 | * | 6/2020 | Conrad | G09F 15/00 |
| 11,946,272 B1 | * | 4/2024 | Newstrom | E04H 13/008 |
| 12,523,056 B2 | * | 1/2026 | Bautz | E04H 13/008 |
| 2004/0098846 A1 | * | 5/2004 | Glass | A61G 17/007 27/29 |
| 2005/0029206 A1 | | 2/2005 | Macarthur-Onslow | |
| 2006/0179624 A1 | * | 8/2006 | Glass | A61G 17/007 27/1 |
| 2009/0199376 A1 | * | 8/2009 | Hume | E04H 13/006 27/1 |
| 2010/0139060 A1 | * | 6/2010 | Leeder | E04H 13/008 52/103 |
| 2013/0185907 A1 | * | 7/2013 | Langelier | A61G 17/08 27/1 |
| 2014/0000134 A1 | * | 1/2014 | Cox | A61G 17/04 40/124.5 |
| 2016/0376810 A1 | * | 12/2016 | Eickhof | E04H 13/003 52/133 |
| 2017/0298648 A1 | | 10/2017 | Eickhof et al. | |
| 2018/0023313 A1 | * | 1/2018 | Power | E04H 13/008 52/128 |
| 2018/0221233 A1 | | 8/2018 | Conrad | |
| 2018/0251998 A1 | * | 9/2018 | Lockhart | A61G 17/08 |
| 2024/0093527 A1 | * | 3/2024 | Bautz | E04H 13/008 |
| 2024/0271455 A1 | * | 8/2024 | Rossi | E04H 13/008 |

FOREIGN PATENT DOCUMENTS

| | | | | | |
|---|---|---|---|---|---|
| DE | 20000627 U1 | | 5/2001 | |
| DE | 10001506 A1 | | 7/2001 | |
| DE | 20208111 U1 | * | 9/2002 | E04H 13/006 |
| DE | 20209962 U1 | | 9/2003 | |
| DE | 202005015974 U1 | * | 4/2006 | E04H 13/003 |
| DE | 202008011607 U1 | | 12/2008 | |
| DE | 202016101639 U1 | | 5/2016 | |
| DE | 102019005470 A1 | * | 7/2020 | E04H 13/008 |
| JP | 3211476 U | | 7/2017 | |
| JP | 3211632 U | * | 7/2017 | |
| JP | 3222057 U | | 7/2019 | |
| JP | 3236545 U | * | 2/2022 | |
| KR | 101140946 B1 | | 5/2012 | |

OTHER PUBLICATIONS

Australian Examination Report No. 2 from AU Application No. 2022242178, mailed on Dec. 4, 2024, 6 pages.

Extended European Search Report from EP Application No. 22773812.7, mailed on Jan. 29, 2025, 8 pages.

International Search Report for International Application No. PCT/AU2022/050274, mailed on May 2, 2022, 4 pages.

Written Opinion for International Application No. PCT/AU2022/050274, mailed on May 2, 2022, 6 pages.

* cited by examiner

A

B

ABOVE-GROUND ASH INTERMENT SYSTEM

FIELD OF THE INVENTION

The present invention relates to storing biological remains and devices for doing so.

The invention has been developed primarily but not only for storing cremated animal or human remains such as ashes over an extended period. While its primary aim is to store the calcined remnants of the cremation process, its application is not limited to cremated ashes or calcined bone fragments.

BACKGROUND OF THE INVENTION

Any discussion of the prior art throughout the specification should in no way be considered as an admission that such prior art is widely known or forms part of common general knowledge in the field.

The treatment and disposal of the bodies deceased humans has been central to the human experience and culture across the globe for multiple millennia. This is evidenced by the many distinct methods and rites employed for disposing said bodies developed by human cultures. Cremation as the practice of burning deceased bodies of humans and animals is believed to have been practiced by humankind since they discovered fire. Traditionally it has been common in many cultures and religions, but particularly among cultures outside of Roman and Abrahamic religious sphere.

In western societies, while cremation has been historically shunned in favour of burial influenced by long-standing and dominant Judeo-Christian doctrine, the rite has become increasingly popular in recent years. This is in response to many factors, including environmental concerns over chemicals released from degradation of coffins and human bodies as well as the perceived cleanliness of ashes as opposed to an interred disintegrating body. However, these driving factors are largely eclipsed by the scarcity of appropriate surface and sub-terranean space that can be allocated to burying coffins containing dead bodies in modern western countries, resulting in their prohibitively high costs.

In contrast to burial, cremation is a conclusive and comparatively rapid process that subjects the deceased body to temperatures between 760 and 1,150° C. by exposing the body and/or a coffin to a flame. While it can be performed out in the open by a funeral pyre, the modern cremation process is able to achieve the higher end of this range by performing the combustion reaction inside an enclosed kiln-like space. By exposing the deceased body to a higher temperature, more effective and complete combustion can be performed. The resulting fragments remaining from the process are unburned calcified remnants the body's bones. They are typically milled to improve its aesthetics and for ease of packing and transport. The average human body produces approximately 2.4 kg of these 'ashes', which subsequently are stored or disposed of in the environment.

Further demand for cremation has been driven by widespread rearing of domesticated animals as pets, and the growing movement for their owners to honour their death in a similar fashion to humans. Pet owners in this regard are increasingly likely to cremate the deceased body of their pets and inter them to create a lasting memory. As a result, a storage solution that can efficiently and effectively store both human and animal remains are required.

Furthermore, it is known that vertical structures are comparatively cost effective and efficient in in providing storage space compared to more horizontal, grounded structures of same structural volume, especially when ground-level surface area is limited. This is true whether the structure is seeking to store live humans in a high-rise building or cremated remains. Considering the growing number of cremations across the globe and limited ground surface area appropriate for interment, it is expected that more efficient vertical structures for storing cremated remains and a method of enabling them are going to be required.

The remaining unmilled fragments or milled powders produced from the cremation process are typically stored inside a container known as an urn and interred at either specific sites or at homes alongside multiple others. Known methods for storing said urns are columbaria, each typically comprised of a structure with horizontal recesses or niches to which the urns are placed. Typically, the urns are placed on top of a horizontal beam or platform, requiring the overall structure to be able to support the weight of said horizontal members and the multiple urns places on it. This requires physically higher structures to become bulky to support said weight, while limiting the possible shapes and sizes that said support structure can take. As a result, typical freestanding columbarium structures are broad, low height structures with functional, if not unimpressive aesthetics. In a similar vein, if urns were to be vertically stacked on top of each other, any such structure would require the urns closer to the ground to be made of stronger, more expensive material, or larger to support the multiple urns above, resulting in an excessively bulky and less aesthetically pleasing structure. As a result, substantially vertical or freeform structures are rare, uneconomical to produce and are typically not aesthetically pleasing.

Moreover, urns with sizes or volumes that deviate from the standard size suited to store the approximately 2.4 kg of human cremated remains are accommodated in the known devices by wasting space inside the recesses or niches. Considering the value of space and expected increases in demand for interring human and animal remains side-by-side, as outlined above, a more flexible solution which can accommodate urns of differing sizes is needed.

As described, the existing devices and methods of storing cremated remains are not well suited for space-efficient, flexible, and aesthetically pleasing long-term storage of cremated remains.

OBJECT OF THE INVENTION

It is an object of the present invention to overcome or ameliorate at least one of the disadvantages of the prior art, or to provide a useful alternative.

It is an object of the invention in its preferred form to provide a device and a method of using said device to store cremated human or animal remains in an efficient, flexible, and aesthetically pleasing manner over an extended period.

SUMMARY OF THE INVENTION

According to a first aspect, the present invention provides a device for storing and memorializing biological remains, comprising:

- at least one elongated support member; and
- a plurality of containers, each container adapted to individually engage with said elongated support member while storing said biological remains, wherein upon said engagement, each container is securely engaged with said elongated support member to form an array of containers along said elongated support member.

In an embodiment of the present invention, each container is adapted to individually engage with or disengage from the elongated support member without affecting the engagement of remaining containers in the array.

In another embodiment, the biological remains comprise cremated remains.

In a further embodiment, the biological remains comprise cremated animal or human remains.

In an additional embodiment, the elongated support member comprises an elongated prism.

In yet another embodiment, the prism is substantially V-shaped in cross section.

In an embodiment, said elongated support member extends out from a base.

In a further embodiment, the base is substantially flat.

In another embodiment, the base is substantially circular.

In an additional embodiment, the elongated support member comprises substantially central and lateral portions.

In a further embodiment, the central and lateral portions are substantially co-extensive.

In yet another embodiment, the central portion is adapted to engage with and support each container such that the weight of each container is supported solely by said central portion.

In an embodiment, the central portion comprises a rectilinear member.

In another embodiment, said lateral portion comprises at least one wing column extending perpendicularly from the axis of elongation of the central portion.

In a further embodiment, the lateral portion comprises two wing columns extending symmetrically outward from opposed elongated faces of the central portion.

In an additional embodiment, each container comprises at least one hollow compartment with at least one orifice opening thereto, the or each container being sealable to securely carry and store the biological remains.

In yet another embodiment, said container is sealable by a cap adapted to substantially isolate the biological remains from the outside environment.

In an embodiment, the elongated support member and each of the plurality of containers comprise complementary engagement means to securely mount each container to the elongated support member.

In yet another embodiment, the engagement means are elongate fasteners extending out from the elongated support member, and the complementary engagement means comprise complementary fasteners adapted to engage with said elongate fasteners.

In an additional embodiment, the elongate fasteners are threaded bolts penetrating through and extending out from the elongated support member, and the complementary engagement means are embedded tapped threads adapted to be in threaded engagement with said threaded bolts.

In another embodiment, each container is in the shape of a prism elongated along said elongated support member.

In a further embodiment, the array comprises containers with at least two different volumes.

In an additional embodiment, each container in the array is substantially identical in cross-section.

In yet another embodiment, each container has different elongated lengths.

In an embodiment, said each container has a front face, adapted to be directed outwardly towards a viewer, and a rear face, adapted to provide the complementary engagement means.

In another embodiment, the elongated support member is adapted to temporarily mount each container thereto.

In a further embodiment, the at least one temporarily engaged container is adapted to be engaged to the elongated support member by being placed on at least one shelf extending from said elongated support member.

In yet another embodiment, said elongated prism comprising the container has a substantially isosceles trapezoidal cross-section.

In an embodiment, the two wing columns extend at an angle between 1 and 180 degrees with respect to each other.

In another embodiment, the two wing columns extend at an angle of 60 degrees with respect to each other.

In a further embodiment, each of said two wing columns comprises attachment brackets adapted to engage with external cladding panels.

In an additional embodiment, said elongated support member extends vertically from its base in a columnar manner.

In yet another embodiment, said device comprises a plurality of materials.

In an embodiment, the elongated support member and containers are constructed at least partially from a weather-resistant metal.

In yet another embodiment, the weather resistant metal is stainless steel.

In a further embodiment, the weather resistant metal is bronze.

In an additional embodiment, the cladding panels are constructed at least partially from natural stone.

In an embodiment, the cladding panels comprise granite and/or marble.

In another embodiment, further comprising physical markers adapted to provide a user/viewer, or multiple users/viewers, with information concerning the device or each container and the biological remains stored therein.

In a further embodiment, each physical marker is provided on the surface of either or both the containers and the elongated support member.

In an additional embodiment, each physical marker is electronically coded to provide said information from a data repository when decoded by the user/viewer.

According to a second aspect, the present invention provides a method of storing and memorializing biological remains, comprising:

a. providing an elongated support member adapted to receive and support a plurality of containers holding said biological remains;
b. placing each said biological remains inside a respective container; and
c. placing each container into independent secure engagement with the elongated support member, wherein upon said engagement, each container is securely engaged with said elongated support member to form an array of containers along said elongated support member.

In an embodiment of the present invention, each container is engaged with or disengaged from the elongated support member without affecting the remaining containers in the array.

In another embodiment, the biological remains are cremated animal or human remains.

In a further embodiment, said biological remains are placed in each container comprising at least one hollow compartment with at least one orifice opening thereto, said container being sealable to securely carry and store the biological remains.

In an additional embodiment, each container is sealed by a welch plug/cap press-fitted to said orifice, substantially isolating the biological remains from the outside environment.

In yet another embodiment, said elongated support member and each of the plurality of containers comprise complementary engagement means, the method comprising:

mounting each individual container to said elongated support member via said complementary engagement means.

In an embodiment, the engagement means comprising threaded bolts extending out from the elongated support member make threaded engagement with the complementary engagement means comprising embedded tapped threads provided by each container.

In another embodiment, at least one container is temporarily engaged to and disengaged from the elongated support member during a ceremony.

In a further embodiment, the at least one temporarily engaged container is placed on at least one shelf extending from said elongated support member.

In an additional embodiment, the biological remains are stored in the array comprising containers with at least two different volumes.

In yet another embodiment, the biological remains are stored in containers with substantially identical cross-sections.

In an embodiment, the biological remains are stored in containers with different elongated lengths.

In another embodiment, information concerning the device or each container and the biological remains stored therein are accessed from physical markers.

In a further embodiment, the physical markers are accessed on the surface of either or both the containers and the elongated support member.

In an additional embodiment, electronically decoding the physical markers allows the user to access the information from a data repository.

BRIEF DESCRIPTION OF THE DRAWINGS

Preferred embodiments of the invention will now be described, by way of example only, with reference to the accompanying drawings, in which:

FIG. 6A is a cross-sectional view of said spine along section B-B in FIG. 5C, while

FIG. 7A is a cross-sectional view of said spine along line A-A as shown in FIG. 4.

DETAILED DESCRIPTION OF A PREFERRED EMBODIMENT OF THE INVENTION

Although the invention has been described with reference to a specific example, it will be appreciated by those skilled in the art that the invention may be embodied in many other forms.

The present invention relates generally to devices and methods for storing cremated remains. More specifically, the present invention relates to a device for storing cremated human or animal remains, and a method of storing said remains using the device. The cremated remains can be, for example the remnants of any animal or human after its deceased body is burned using a high temperature flame typically between 760 and 1,150° C. These animals include, but are not limited to, dogs, cats, horses, rabbits and other domesticated or non-domesticated animals which leave calcified fragments of bone when subjected to the cremating high temperature flame. The remnants can be stored in many forms, including large unmilled calcified bone fragments and/or in a milled or pulverised powder form.

In some embodiments, a support or spine preferably extends in an upwardly direction from the ground. The elongated support is adapted to engage and retain a plurality of containers or urns along its length. Each container or urn of said plurality of containers or urns is adapted to engage with the elongated support independently, such that one or more of said containers or urns can be disengaged from or reengaged to said elongated supported without affecting the remaining engaged containers or urns. The containers or urns can be substantially identical in shape, size and length or they may differ at least in length. Each container or urn may comprise a sealable compartment for receiving and storing said cremated remains.

The urns or containers are adapted to be individually engaged to the spine such that they form an array or stack of containers or urns along said elongated support or spine. The engagement of the container or urn on the elongated support is such that each individual urn can be attached and detached to and from said spine without affecting the remaining urns in said stack. Each urn or container does not rely on adjacent urns or containers for its support—as such they can be offset from each other when located in the stack or array of containers. Further, urns of different shapes and sizes can be attached and supported on the elongated support/spine since the engagement means of each urn is identical and adapted to mate with complementary engagement means on the spine. For aesthetic reasons it is preferred the urns are essentially identical in cross section but can differ in length.

Figure 1:
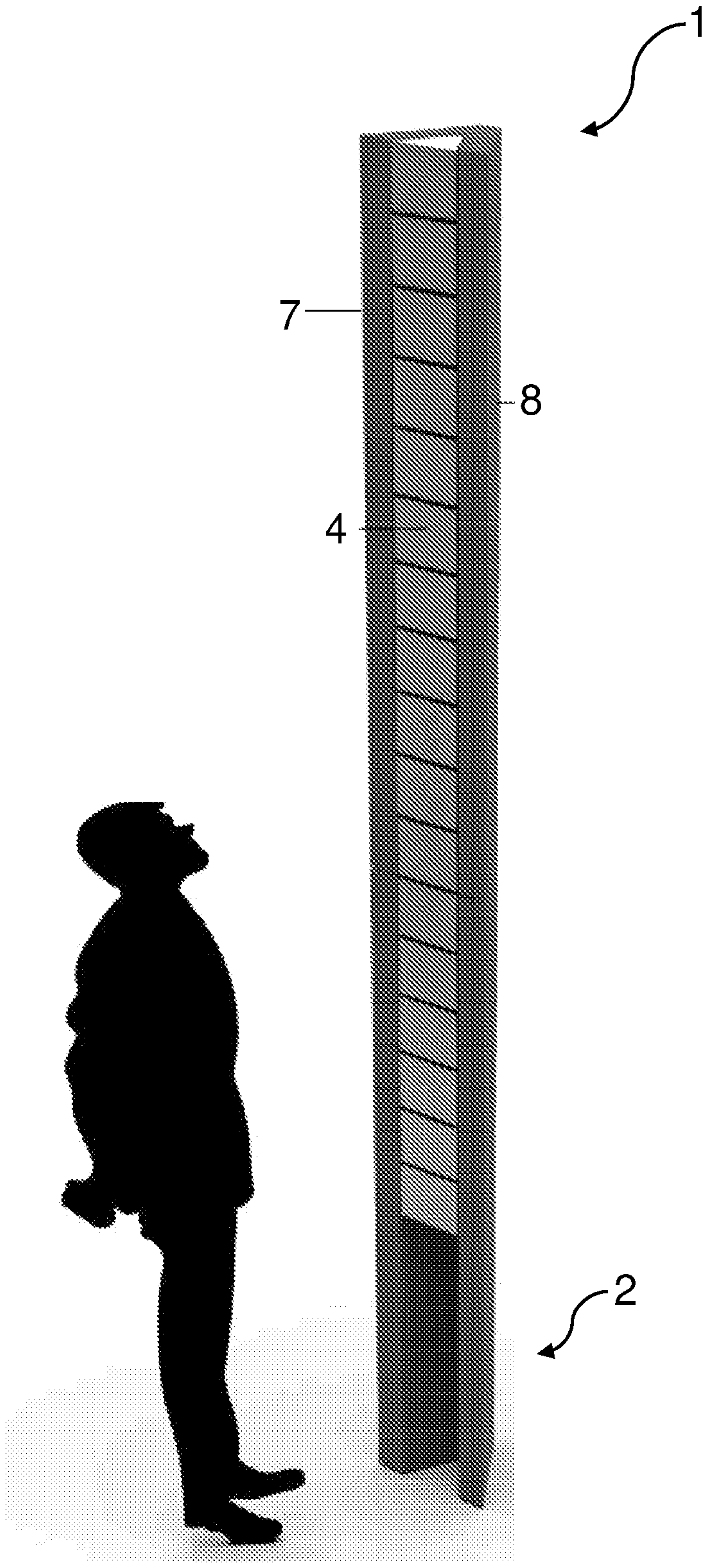
FIG. 1 is a perspective view of the device for storing cremated animal remains in relation to an adult male according to yet another embodiment of the present invention.

In this regard, FIG. 1 illustrates an embodiment of said device in relation to an adult human. In this embodiment, the support is a vertically elongated V-shaped prism extending from the ground and is clad with panels on its elongated faces comprising the exterior of said device. The multiple urns, each containing cremated human or animal remains, are individually engaged with said elongated support in a vertically aligned orientation such that they form a vertical stack along said support. The multiple urns forming said vertical stack are identical in length, and in particular cross-section, whereby their front faces visible from the adult human are substantially horizontally aligned or flush with two of the panels comprising the exterior of the elongated support.

The elongated support or spine can be clad with external cladding or panels to improve both the device's aesthetic qualities and security. Regarding the former, the attachment of panels to the elongated support serves to shield from view surfaces of said support comprising materials and/or features which are less aesthetically pleasing compared to said panels or cladding. Additionally, provided it clads all exterior surfaces and/or is horizontally aligned to the frontal face of the urns, the panels can provide a unified 'clean' or 'minimal' look of the device that is aesthetically advantageous. Moreover, the panels can also provide a security advantage by shielding features used to engage the containers or urns to the elongated support from access by unauthorised parties, or even prevent damage to the containers stemming from impacts and/or lacerations by shielding said container faces.

Further advantages of the device include the space-efficient nature of storage provided and well as the flexibility provided by the ability to disengage and reengage urns when required. Both are facilitated by the independent engagement of said containers to the support. Regarding the first aspect, the individual nature of the engagement means that the weight or load of each container is secured by the elongated support. The support is adapted to securely carry the weight of multiple containers or urns, including their contents, when they form an array or a stack, whatever the orientation. This allows the device to be compact in overall size when compared to conventional storage solutions which seek to store objects, not limited to cremated remains, in containers stacked on top of each other, supporting each other's weight. In such a configuration, the containers will have to be constructed to not only be sufficiently rigid and self-supporting, but particularly those located closer to the bottom of the stack will need to be able to distribute and support the weight of the containers above it. By comparison, the individual engagement of the containers to an elongated support allows each of said containers to be identical in size and cross-sectional area, since they are not required to support the weight of containers above it in a stack. As such, the container and thus the device can be rendered compact relative to the weight and number of objects stored in the present invention.

Figure 2:
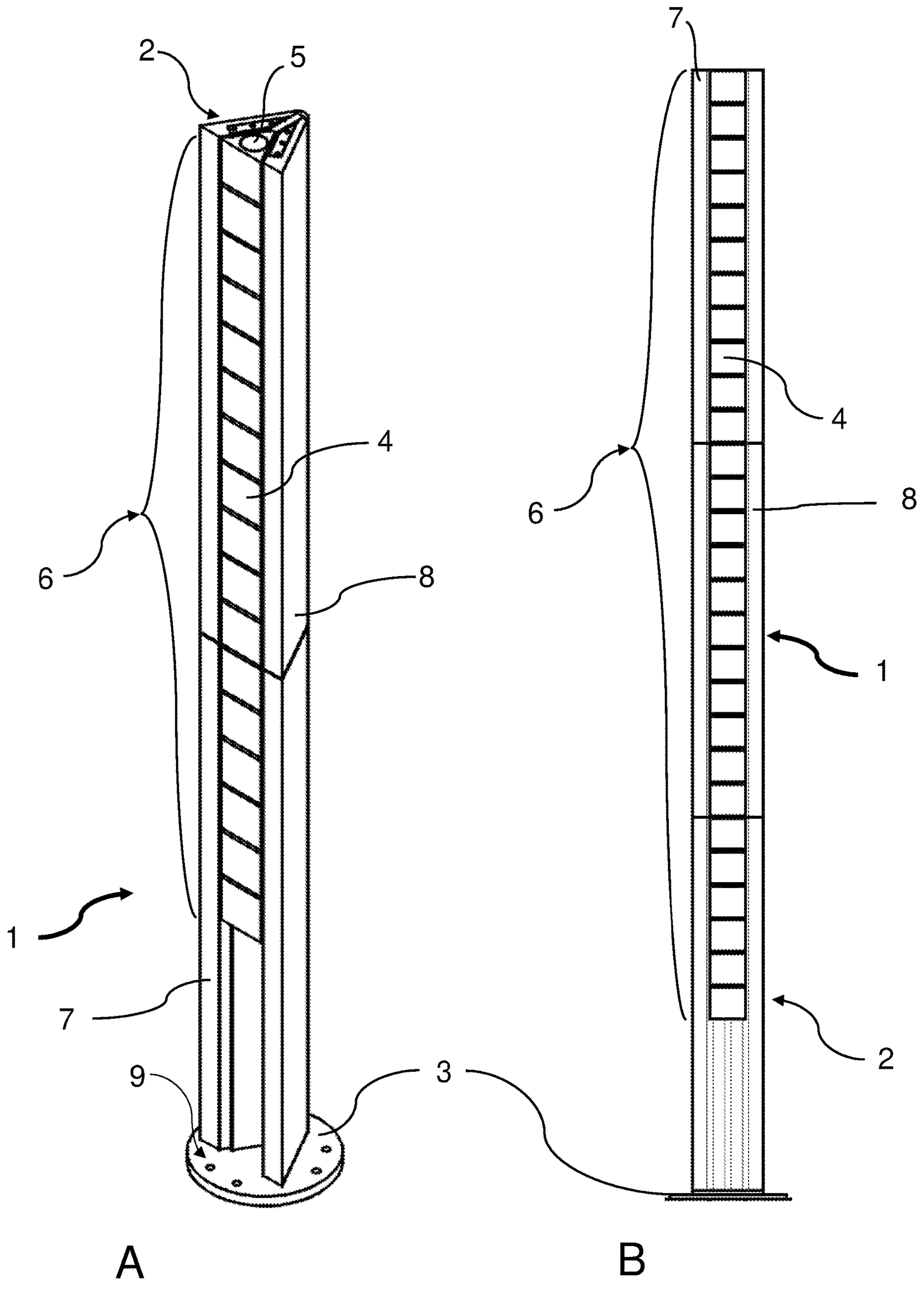
FIG. 2A is a perspective view of a device for storing cremated remains, in accordance with a first embodiment.
FIG. 2B is a front-on view of the same embodiment of said device.

FIG. 2 shows another embodiment of the device 1 comprising a circular base. The same V-shaped elongated support or spine 2 extends vertically from a circular base 3, to which multiple identical urns 4, comprising a container 5 to contain cremated remains, are individually engaged to said elongated support such that they form a vertical stack of urns 6. The V-shaped elongated support is clad with panels 7 and 8 on its elongated exterior surfaces. The panels, when attached to the elongated support, are horizontally in line with the proximal surface of the urns, creating a 'flush' proximal face of the device.

Device 1 is secured to the ground by engagement with the base through a set of penetrating holes 9 adapted to facilitate a threaded bolt making both threaded engagement with a tapped thread in the ground or floor structure with the thread on its distal end, and abutting engagement with the base with the head on its proximal end. Preferably, the penetrating holes accommodate threaded studs extending out of the ground, such that the device can be placed onto said studs and secured by abutting threaded engagement of nuts from above the penetrating holes.

The elongated support or spine can extend from its base in multiple directions provided it can support the weight of the urns and the cremated remains stored inside. For example, said support or spine can extend in a vertical, horizontal, helical, or even arcuate direction—the central spine could even form an arch. The elongated support or spine can comprise an elongated prism extended from its planar base, wherein the elongated length is comparatively longer than any cross-section. The planar base or cross-section can be comprised of any planar shape, but preferably is substantially V-shaped with two wings extending from a central vertex.

Figure 3:
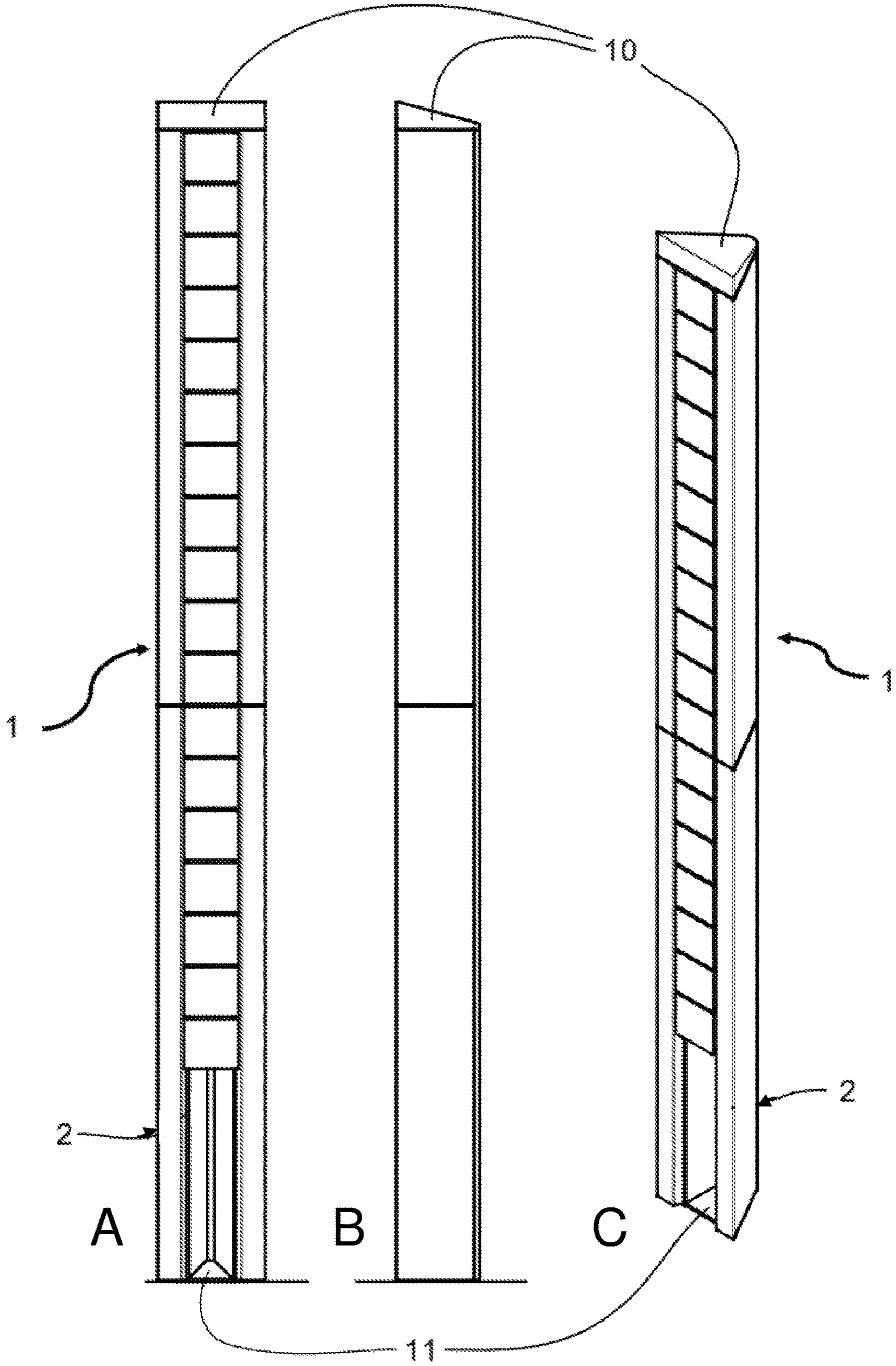
FIGS. 3A, B and C are a front-on view, a side-on view and a perspective view of a device for storing cremated remains, in accordance with yet another embodiment of the present invention.

In such a preferred embodiment illustrated in FIG. 3, the V-shaped elongated support 2 is oriented vertically such that it extends from a subterranean base, or fastening studs extending upwards from the ground. Decorative and non-weight-bearing components, including panels for a sloped cap or hood 10 above the V-shaped elongated support, and sloped infill skirting 11 below the lowest attached container or urn are attached to the elongated support. The former is adapted to drain rainwater from the top of the elongated support, while the latter is adapted to prevent build-up of dirt and other rubbish such as leaves. Beyond decorative purposes, both components serve to prevent extensive fouling of the device when subjected to the outdoor elements.

In such an embodiment, the V-shaped elongated support can be comprised of separate portions with serve differing functions. A central member located at said vertex, specifically adapted to individually and securely engage with multiple containers or urns in order to support or bear their weight, can be provided as part of said elongated support. Such a member can be of any cross-sectional shape as long as it can bear the weight of said engaged containers.

In a preferred embodiment, the elongated support or spine is oriented vertically relative to its base, secured to the ground, such that the urns are extend horizontally from the spine in a parallel direction to said ground. In this preferred formation, multiple urns will form a vertical stack of urns running parallel to the axis of the elongated support member. The elongated support or spine comprises V-shaped material extending vertically from its base, comprising hollow, partially hollow or dense/filled in material adapted to support the weight of the containers or urns in a stable manner. The elongated support spine can comprise one single piece, or an assembly of multiple pieces produced by a plurality of methods including, but not limited to extrusion and folding. Non-weight bearing components such as cladding panels can be secured onto this central elongated support by a plurality of methods. Preferably, said components are secured by brackets and steps fastened and/or welded or brazed onto the V-shaped elongated support, depending on the material used.

Figure 4:
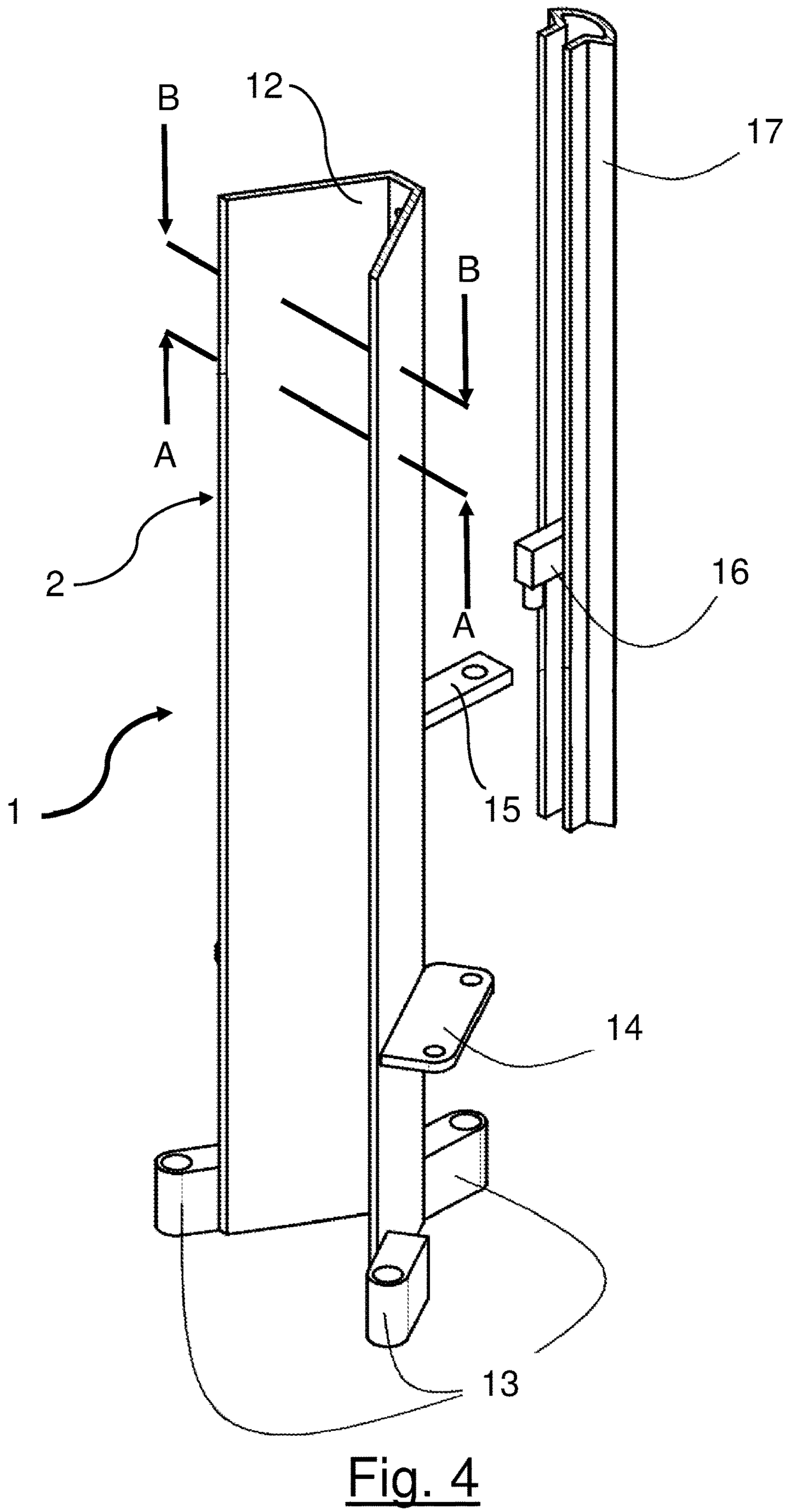
FIG. 4 is a perspective view of a vertical elongated support or spine of the device for storing cremated remains, according to the embodiment shown in FIG. 3.

In such a preferred embodiment illustrated in FIG. 4, the vertical elongated support 2 comprises a central V-shaped member 12 from which several components such as brackets 13 for fixing the elongated support to a base, brackets 14 for mounting exterior cladding panels and brackets 15 to engage and receive the hooks 16 extending from the rear cover assembly 17, all projecting out horizontally. The central V-shaped member is comprised of a single piece of extruded material of the same shape, to which said brackets of the same material are brazed on. For instance, both central V-shaped member and brackets can be made from bronze such that they can be brazed together with ease. Beyond providing lateral support to stabilise the vertical device, the extended wings comprising the central V-shaped member shield from the viewer the engagement mechanism between the elongated support and the containers or urns, improving the device's aesthetics and denying unauthorised access to said mechanism.

Figure 5:
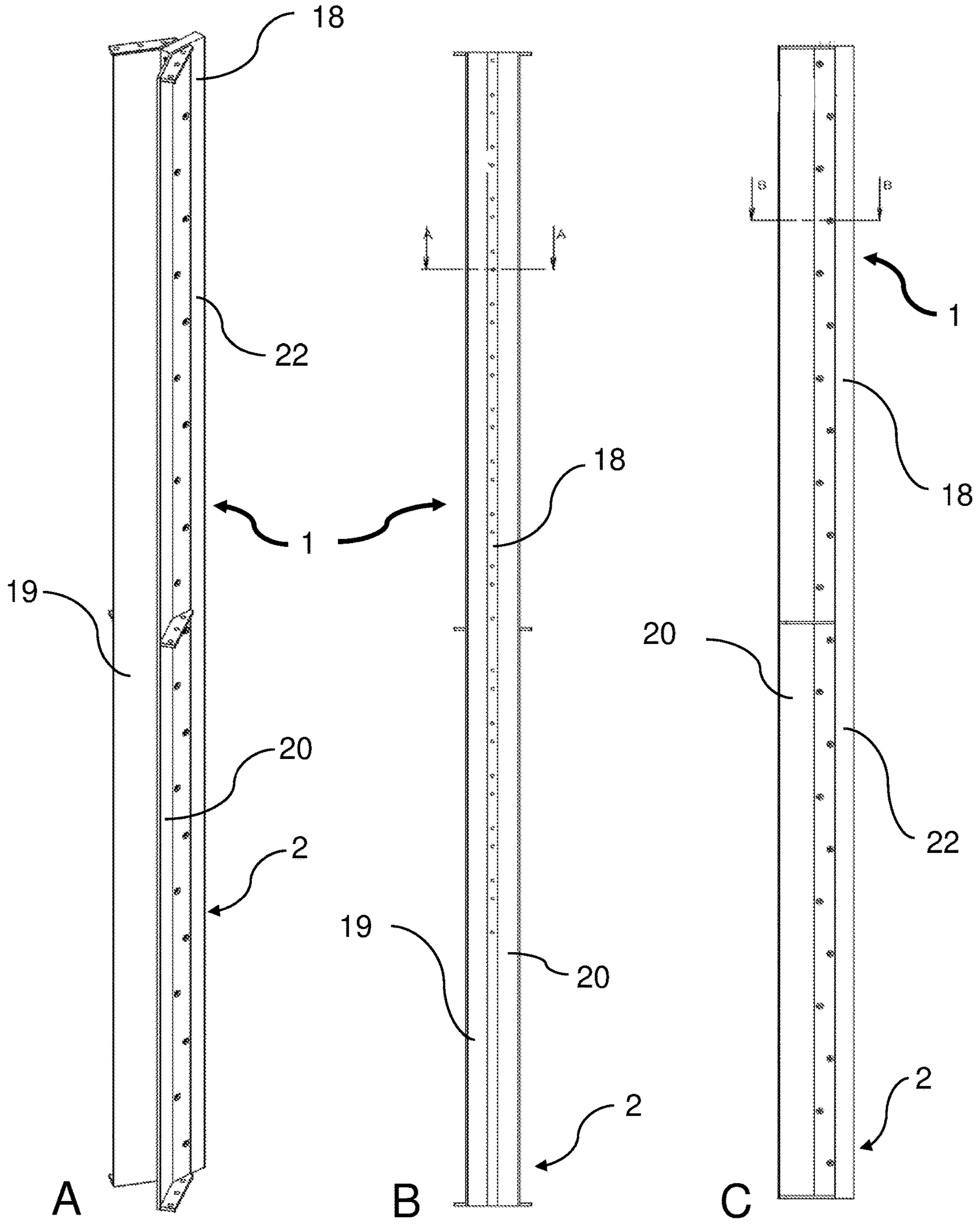
FIGS. 5A, B and C are a perspective view, front-on view and a side-on view respectively of a vertical support spine of the device for storing cremated remains, according to the embodiment shown in FIG. 2.

In such a preferred embodiment illustrated in FIG. 5, the vertical V-shaped elongated support 2 is comprised of a central rectilinear member 18 from which wing columns 19 and 20 extend in a direction perpendicular to said rectilinear member. The wing columns extend out from the elongated faces 21 and 22 projected from the two lengths-sides of the rectilinear member's rectangular cross-section, which are longer relative to the width sides. Similar to the extended wing portions comprising the central V-shaped member of the preferred embodiment, the wing columns 19 and 20 projected, vertically from the planar wings of the V-shaped planar base are adapted to support the weight of the containers by laterally stabilising the elongated support member, as well as improving the aesthetics and security of the device.

Engagement between the elongated support or spine with the containers is facilitated by engaging means provided on the former and their complementary engagement means provided on the latter. Both are specifically adapted to securely engage with respect to each other when engaged by the user. The engaging means can take the form of many mechanisms including, but not limited to, hooks, bolts, screws, magnets, pegs and dowels, and their respective complementary engagement means such as tapped threads, hooks, hooking loops, dowel recesses and magnets. Multiple engaging means and complementary engagement means can feature such that multiple combinations of engaging mechanisms can be used to secure said containers to the elongated support. The containers or urns can be engaged to and disengaged from the elongated support when desired by the user. This means both the containers and elongated support are adapted to be in both long-term and relatively short-term engagement with each other. When the latter is true, the elongated support featuring engaging means such as hooks, magnets, pegs, dowels, adhesive material, and tape can be brought into engagement with containers or urns comprising appropriate complementary engagement means.

Preferably, the engaging means are threaded members extending in a perpendicular direction from the elongated support or spine, adapted to make threaded engagement with a complementary engagement means in the form of a tapped thread embedded in each container or urn. In such embodiments, the threaded members can be comprised of embedded screws, and/or threaded bolts partially penetrating through holes provided by the elongated support. With regards to the latter, said through holes embedded in the elongated support or spine are adapted to maintain abutting engagement with the head of the partially penetrating threaded bolts while providing access at either orifice for the threaded end of the bolt and fastening action by the user at the other.

Figure 6:
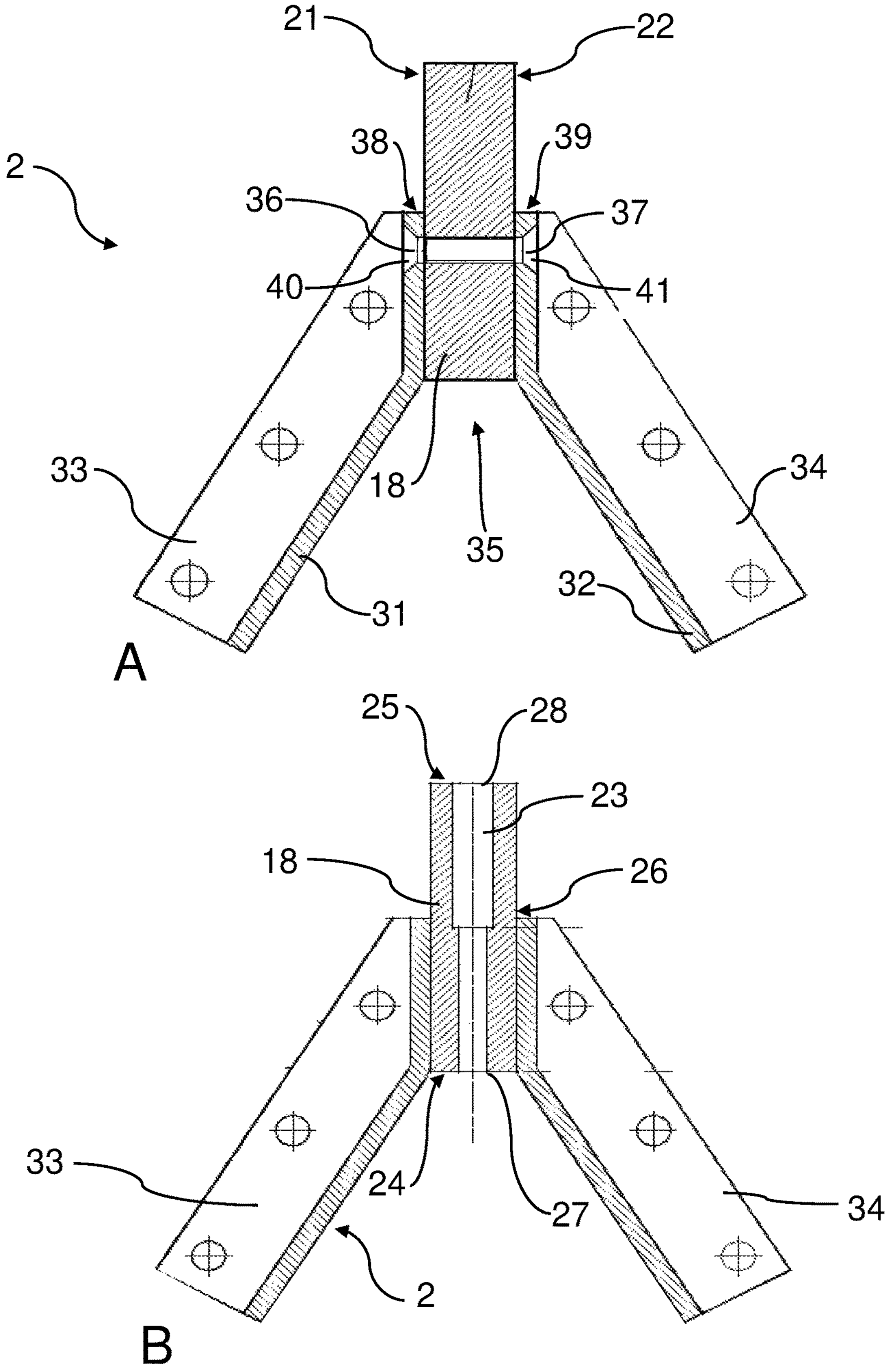
FIGS. 6A and B are enlarged sectioned views of the elongated support member in accordance with an embodiment of the present invention.
FIG. 6B is a similar view along section A-A in FIG. 5B.

In FIG. 6B a sectional view of the device comprising the elongated support or spine 2 is taken along line A-A illustrated in FIG. 5B. Hole 23 of this embodiment penetrates the rectangular cross-section of the central rectilinear member 18 between its two width faces 24 and 25. The above preferred embodiment provides said hole adapted for a threaded bolt to partially feed through and make threaded engagement with a tapped thread embedded in a container or urn. A constriction 26 midway through the hole is adapted to retain the head of a threaded bolt such that only the threaded screw end of said bolt extends perpendicularly out of the rectilinear member 18 at orifice 27. A further orifice 28 is provided by the rectilinear member for the user to feed through said bolt and access its head for fastening when in threaded engagement with said tapped thread complementary engagement means of a container or urn.

Figure 8:
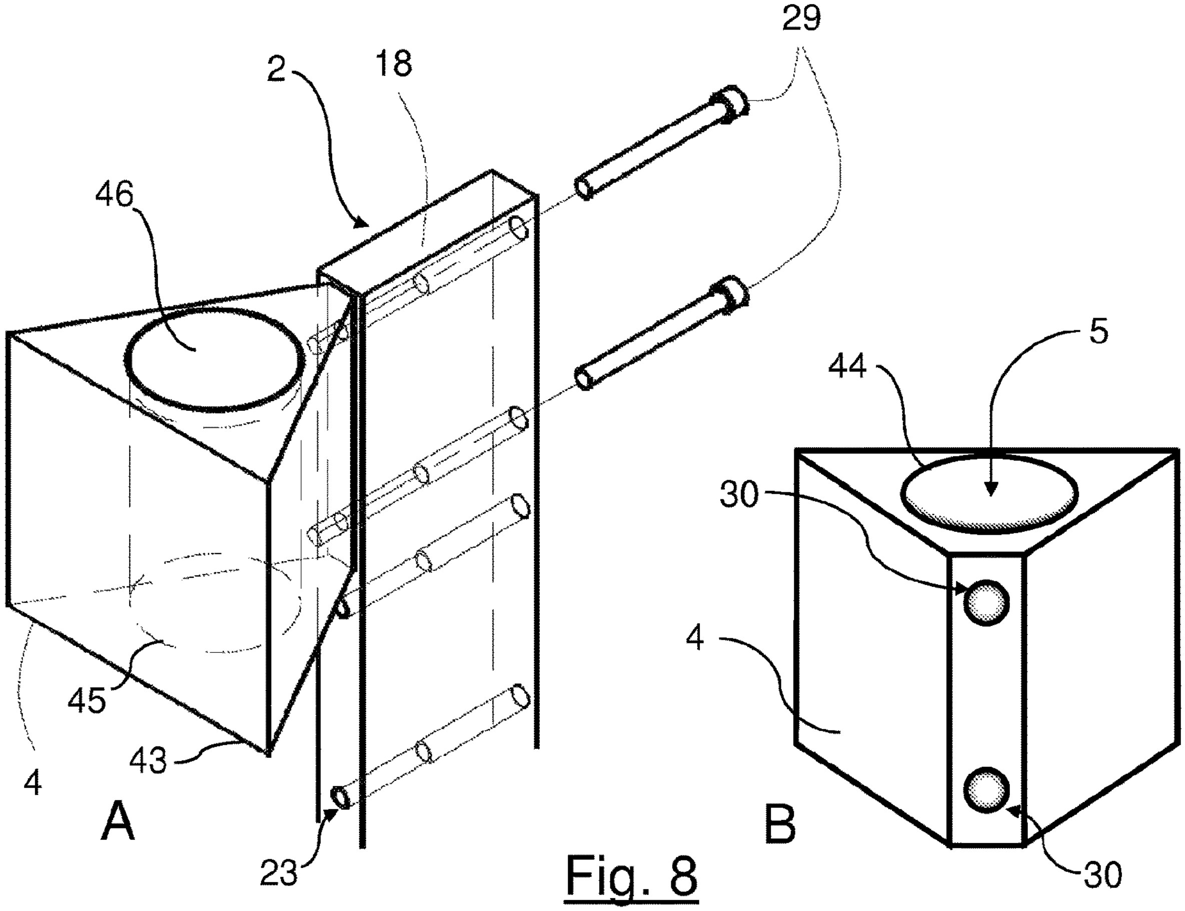
FIG. 8A is an exploded transparent fragmentary view of the elongated support member engaged with an urn according to an embodiment of the present invention.
FIG. 8B is a front-on isometric view of said urn, illustrating the complementary engagement means and the hollow compartment for storing the biological remains.

Further details of this preferred embodiment are provided in FIG. 8A, which is an exploded view of one container or urn 4 engaged with the central rectilinear member 18 of the elongated support 2. The two components are securely engaged by a pair of threaded bolts 29 inserted into holes 23 such that they make threaded engagement with their respective complementary engagement means of the container. As shown in FIG. 8B, said complementary engagement means of the container is provided in the form of tapped threads 30 embedded into the container.

In certain situations, such as during ceremonies, temporary engagement of the containers to the elongated support may be required. In embodiments that facilitate this, short-term engagement is achieved by selecting an appropriate engaging means and complementary engagement means for easy attachment and detachment of said containers. The engaging means this embodiment can include, but are not limited to, adhesives, tape, magnets, hooks, pegs, and dowels, and their complementary engagement means attached to, or embedded in the containers or urns.

Further temporary engagement with the elongated support or spine can be provided by placing the one or more containers or urns on a shelf, or multiple thereof, extending from said elongated support in a direction suited to support said container by gravity alone. The shelf or shelves do not require said containers to be fixed onto it, other than by gravity. The shelf or shelves can comprise complementary engagement means adapted to securely engage with the engagement means provided by the elongated support using the same mechanisms outlined above for the containers such that they can be temporarily or permanently fixed to said elongated support. Alternatively, the shelf or shelving can be permanently welded onto the elongated support. When in use, the shelf or shelving can support at least one container placed on it, substantially aligning it with the more permanently fixed containers.

Preferably, one shelf is fixed to the elongated support at or substantially near the lowest container position possible on the elongated support. Preferably the shelf is temporarily engaged with the elongated support by a tapped thread threadedly engaged with a threaded bolt extending out of said support. The shelf is adapted to abuttingly engage and support the containers temporarily while a ceremony is conducted.

As mentioned above, in certain embodiments, the elongated support or spine can be comprised of a central portion adjacent to the engaging means in order to support the weight of the containers or urns, and a lateral portion. Lateral portions of the elongated support can be comprised of elongated members including elongated prisms, brackets, and steps to hold additional components. Furthermore, they can provide sites for further attachment and detachment of non-weight bearing components such as external cladding panels.

The concentration of weight-bearing components can also allow for other portions of the elongated support to be non-supportive or supportive to a limited degree, such as in a lateral direction perpendicular to the direction of its extension. Lateral portions which are non-supporting or provide limited support can also function to improve aesthetic, security and/or other qualities of the device. These portions can serve to shield various features of the device such as the engagement mechanism or less-aesthetic materials from view of the user. Moreover, by shielding important features, the lateral portions of the elongated support or spine can prevent access to said features by unauthorised users. This represents a security advantage of the device for storing cremated remains.

The above shielding features of the lateral portions of the elongated support are provided by its abutting engagement with the containers or urns when it is securely engaged via the provided engaging means and complementary engagement means. Abutting engagement is preferably facilitated by adapting the shape of the lateral portions to match that of the containers or urns, such that when brought into abutting engagement, the respective elongated faces of the support and containers abut and are flush with respect to each other. As such in preferred embodiments of the device, the lateral and central portions of the elongated support are shaped to define a channel along its length matching the shape of the containers or urns, such that multiple faces be in flush or abutting engagement. Preferably the channel is an open channel defined by the partially enclosed faces of the portions comprising the elongated support. In embodiments with two wing columns comprising the lateral portions, they can extend from the central portion at any angle between 1 and 359 degrees with respect to each other. Preferably, said wing columns extend out at angles between 1 and 180 degrees with respect to each other. Even more preferably, the angle is between 45 and 90 degrees. Most preferably, the angle is 60 degrees.

In a preferred embodiment where the lateral portions extend at 60 degrees to each other, said portions are comprised of wings formed by vertically elongated sheets bent at a 30-degree angle along their entire length. When said portions of the wing columns extend out from said corners of the rectilinear member, another portion of each sheet is making abutting engagement with part of its elongated length-side face. In some embodiments, multiple lateral portions can extend out from a central portion comprising a cylindrical steel pole to form a star-shaped elongated support.

As illustrated in FIG. 6A through a sectional view of the elongated support or spine in FIG. 5C along line B-B, in certain embodiments the V-shaped elongated support 2 is comprised of two lateral wing columns 31 and 32 extending from the two opposing length faces 21 and 22 of the rectilinear member 18 along its entire length. The lateral wing columns are both comprised of bent sheet brackets 33 and 34, which combined with the rectilinear member define a continuous vertical channel 35. As illustrated in FIG. 4B, the bent sheet brackets 33 and 34 extend from the central rectilinear member 18 symmetrically such that they deflect away from each other at a 60-degree angle.

Said bent sheet brackets are secured to the central rectilinear member by staggered countersunk threaded bolts 36 and 37 which are in secure threaded engagement threaded holes 38 and 39 embedded in said rectilinear member. Said staggered bolts penetrate the two opposed bent sheet brackets 33 and 34 at holes 38 and 39 respectively, heads 40 and 41 on their proximal ends abutted engaging with the brackets, such that they bring the lateral wing columns into secure abutting engagement with the central portion on opposing length faces 21 and 22. In alternative embodiments of the invention, the two opposed bent sheet brackets can be welded to said rectilinear member.

Figure 7:
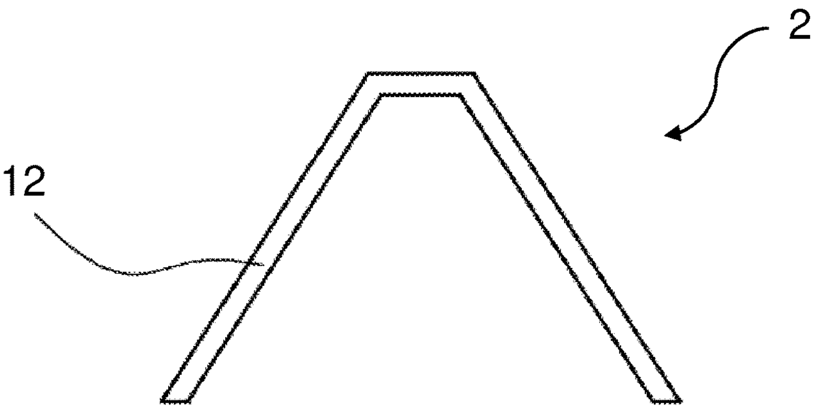
FIGS. 7A and B are section views of the elongated support member in accordance with an embodiment of the present invention.
FIG. 7B is a cross-sectional view of said spine with the back panel attached, taken along line B-B as shown in FIG. 4.
Figure 7:
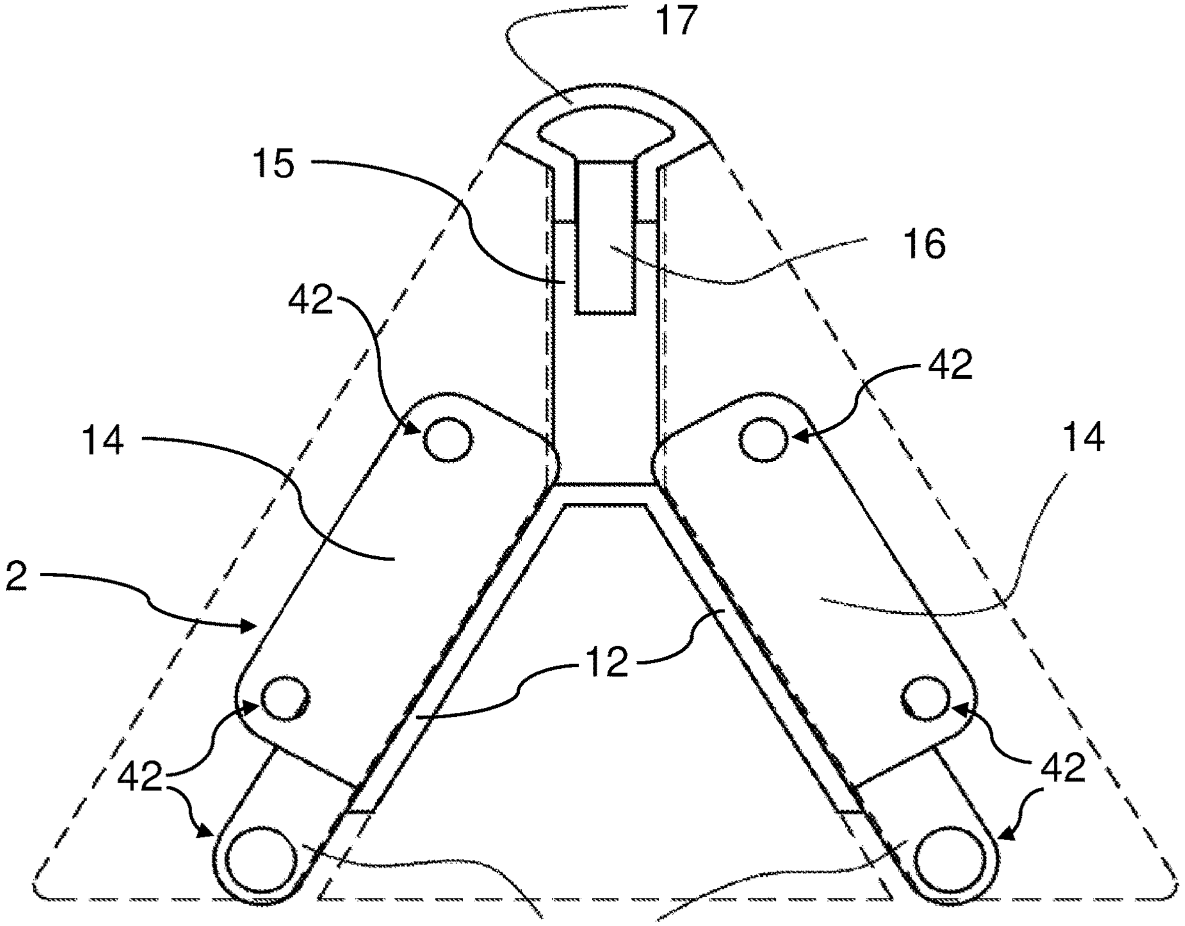

FIG. 7A shows a sectional of the central V-shaped member 12 along line A-A shown in FIG. 4 of the preferred embodiment. Said V-shaped member is adapted to receive, abut, and make secure fastening engagement with urns or containers. As such, said member comprises penetrating holes adapted to accommodate engagement means such as threaded bolts to fatteningly engage with said urns or containers.

Similarly, FIG. 7B shows a sectional view of the V-shaped elongated support or spine 2 illustrated in FIG. 4 with the back plate 17 attached, taken along line B-B. This view of the preferred embodiment shows the brackets 14 and 15 respectively, for attaching non-supportive components such as cladding panels and the back plate 17 brazed onto the central V-shaped member 12, as well as supportive components such as brackets 13 to secure the elongated support at a base or to accommodate threaded studs extending from the ground. Each of the brazed-on brackets have penetrating holes or engagement means 42 adapted to accommodate various engaging means including threaded screws and/or hooks to secure the elongated support itself and non-supportive components likewise.

An urn in the context of the present specification, refers to a container or receptacle having a hollow compartment suitable for the long-term storage of cremated human or animal remains including calcified bone fragments, milled or unmilled. Each urn is adapted to individually engage with the elongated support or spine such that they can be attached and detached without affecting the position or requiring movement or disengagement of other urns attached to said support. The ability to engage and disengage the containers or urns from the elongated support allows comparatively easier access to each individual container or urn. As the device does not require the user to support or reorder the remaining urns or containers when accessing one container or multiple thereof located in a stack, overall functionality of the device is increased when said support is vertical or substantially vertical. Considering stacking vertically is inherently more space efficient compared to similar horizontal configurations ground space is limited, the individual engagement of urns in a vertically stackable configuration of containers provides a functional advantage.

A further functional advantage provided by the individual engagement of the containers with the support is the flexibility in container size. This flexibility is provided by the fact that the containers make engagement directly with the elongated support, rather than through a plate or shelf-like structure to distribute the weight of each individual container. As such, there is no need for the elongated support to provide any such structures to securely engage multiple containers in a stack—removing limits to container size and engagement position along said support. This direct engagement allows the container or urn to be of any size as long as it can make engagement with and its weight can be supported by said elongated support. Furthermore, since the same engaging means are used in the containers of differing size and distributed to make secure engagement with the complementary engagement means on the elongated support, an array or stack of containers including said containers of differing sizes can be arranged in any order.

While the container or urn can be comprised of varying shapes and sizes, each urn preferably has a front face, adapted to be directed outwardly towards a viewer, and a rear portion, preferably adapted to include the engagement means for connection to the elongated support spine. In certain embodiments, containers or urns can be shaped as a prism elongated in a parallel direction to that of the elongated support or spine. For example, each urn or container can take the form of, but is not limited to, a prism with a substantially triangular base, a circular base, quadrilateral base, or a pentagonal base. Preferably, the container or urns are in the shaped of a prism with a trapezoidal base. It is even more preferable for the urns to comprise a base in the shape of an isosceles trapezoid, wherein the two non-parallel sides or legs are equal in length.

While the urns can take the shape desired, it is preferred each urn on a respective support spine, be identical in cross section. This has advantages in construction as reduced cost of construction can be gained from mass production of one horizontal size. Economies of scale can be achieved by specialising production equipment to produce containers or urns of constant horizontal size using techniques such as extrusion moulding. Further advantages include aesthetic uniformity gained by the alignment of the front faces, and the difficulty gaining unauthorised access to the engagement mechanisms of said containers when multiple thereof are engaged to form an array or stack of urns along said elongated support or spine.

One preferred embodiment shown in the exploded transparent perspective view of FIG. 8A comprises one of the multiple containers or urns 4 comprising an elongated prism with a substantially isosceles trapezoidal base 43 individually engaged with the central rectilinear member 18. The container or urn is securely engaged with said support by a pair of threaded bolts 29 inserted into holes 23 such that they make threaded engagement with their respective complementary engagement means in the form of tapped threads 30 embedded in the container.

The cremated animal remains are stored inside each container or urn comprising at least one hollow compartment with an orifice on at least one face of said urn. The compartment is adapted and scaled to hold said remains corresponding to part or whole of a human or animal, or multiple thereof for a long period of time. Accordingly, the hollow compartments can be sealed from the atmosphere to stop potential atmospheric degradation across multiple years. Furthermore, antimicrobial coatings can be applied to the walls of said receptacle hollow compartment to prevent growth of bacteria and other undesired microbes. The container embedded in the urns are substantially sealable from the outside atmosphere by placing an air-tight cap at its orifice. For example, this air-tight cap can take the form of a press-fit stopper, a welch plug/cap, a lid or a screwable cap with gasket material such as soft plastic to seal the container.

The at least one hollow compartment can be aligned with the cross-sectional centre of the container or urn it is embedded in, in order to maximise the area available for the orifice and thus the volume of said compartment. The hollow compartment can take any shape but is preferably a hollow prism with one base comprising its orifice. The orifice or base can be comprised of any planar polygon including, but not limited to, circular, ovular, quadrilateral or hexagonal bases. Furthermore, the base in the form of the orifice can be coplanar with at least one face of the urn, such that the hollow compartment is open to the atmosphere in the absence of a seal and extends along the same axis as the elongated prism comprising the container or urn.

In a preferred embodiment illustrated in FIG. 8B, the sealable hollow compartment 5 is embedded in one of the urns 4, defined by its circular orifice 44 at the surface extending down into the urn. As seen in FIG. 8A, this extension of circular orifice 44 defines an embedded cylindrical prism 45 comprising said compartment. The orifice is substantially co-axial and concentric with the trapezoidal cross-section of the container or urn, such that the hollow compartment is substantially centred and extends down into said container or urn along the same axis of elongation. The orifice extends for part of the vertical length of the urn such that the container is sealable by a circular cap 46 at its orifice 44. The circular cap preferably has soft plastic material located on the cap's edge to form an airtight seal with the edges of the orifice.

Both the urn or container and the embedded receptacle compartment are adapted to vary in capacity to accommodate varying volumes of cremated remains. The storage capacity of the urns can be varied by several ways, including but not limited to changing the capacity of the embedded sealable compartment by varying its width or length. The containers or urns can be adjusted in size to accommodate said changes. For example, the storage capacity of the urns can be adjusted by lengthening or shortening the overall length of said embedded hollow compartment—alongside similar changes to the overall length of the accommodating container or urn. If maintaining a uniform cross-section across multiple containers in an array or stack is preferred, the change in volume required can be solely accommodated by said change in respective lengths of the sealable hollow compartment and the container.

Figure 9:
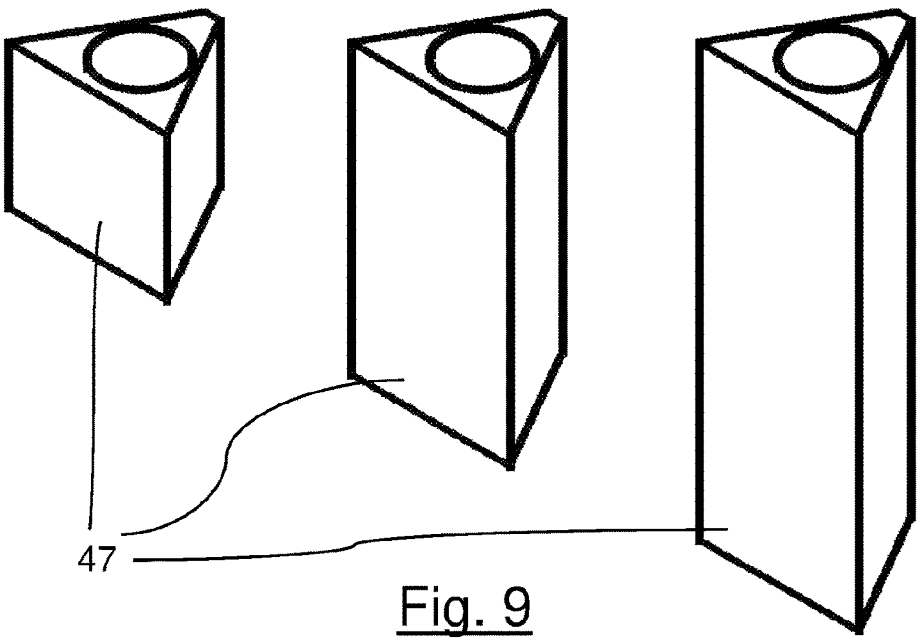
FIG. 9 is a perspective view of the urns with varying vertical length in accordance with another embodiment of the present invention.

In this regard, FIG. 9 illustrates urns with varied vertical lengths 47, all adapted to store cremated human or animal remains inside its embedded sealable hollow cylindrical compartment. The containers of varied length also comprise hollow cylindrical compartments of varied volume according to said container or urn length. The figure illustrates one of the preferable embodiments wherein the urns' overall lengths comprise multiples of the smallest therein.

A stack or array of containers or urns may be comprised of containers or urns with differing and varied sizes. In some embodiments, a stack or array can be comprised of containers or urns with differing lengths along the elongated support member to which it is engaged to. A multitude of combinations comprising larger, smaller, shorter and longer urns to form the stack are possible, provided that they are all securely engaged with the elongated support by their respective engaging means and complementary engagement means. The flexibility of attaching containers or urns of differing length parallel to the elongated support can be provided by multiple engaging means located along said elongated support. Said multiple engaging means can be provided at set distances along the elongated support or spine such that every container or urn comprises at least one complementary engagement means making engagement with at least the same number of said engaging means. While one set of engaging means and complementary engagement means may be sufficient to securely engage lighter and/or smaller containers or urns to the elongated support, heavier or larger containers or urns can have more than one complementary engagement means to make engagement with the same number or more engaging means on said elongated support. By increasing the number of sites of engagement between the container or urns and the elongated support, the weight of said containers and their stored cremated remains can be distributed across more engaging means and their respective complementary engagement means. Furthermore, the engaging means can be located on the elongated support at set distances apart with respect to each other such that each one of the multiple containers or urns in an array or a stack are engaged to the elongated shaft at set spacings apart from each other to provide an offset between each for ease of attachment and detachment. Further to the engaging means, the elongated support can comprise complementary alignment members adapted to abuttingly engage with at least one complementary engagement means on said containers or urns. When engaged, said alignment members prevent said engaged containers from rotating or shifting out of threaded engagement with said elongated support member.

In a preferable embodiment where the engagement mean is comprised of threaded bolts, penetrating holes are spaced apart along the elongated support or spine such that the threaded bolts which penetrate it can make threaded engagement with the complementary engagement means comprised by tapped threads embedded in the containers or urns of different lengths. Preferably, the holes for the threaded bolts are provided at set distances along the elongated support or spine for each container or urn to be threadedly engaged by at least one penetrating threaded bolt. Preferably, where longer and/or heavier elongated containers or urns are attached to the elongated support or spine, more than two bolts are preferably provided to adequately support the weight of said urns engaged to the support. Preferably, the penetrating holes, and thus the threaded bolts, and/or their complementary engagement means are located on the elongated support and/or the containers respectively, such that said containers are offset from each other when they are engaged with the elongated support as part of a stack or array comprising multiple said containers.

Figure 10:
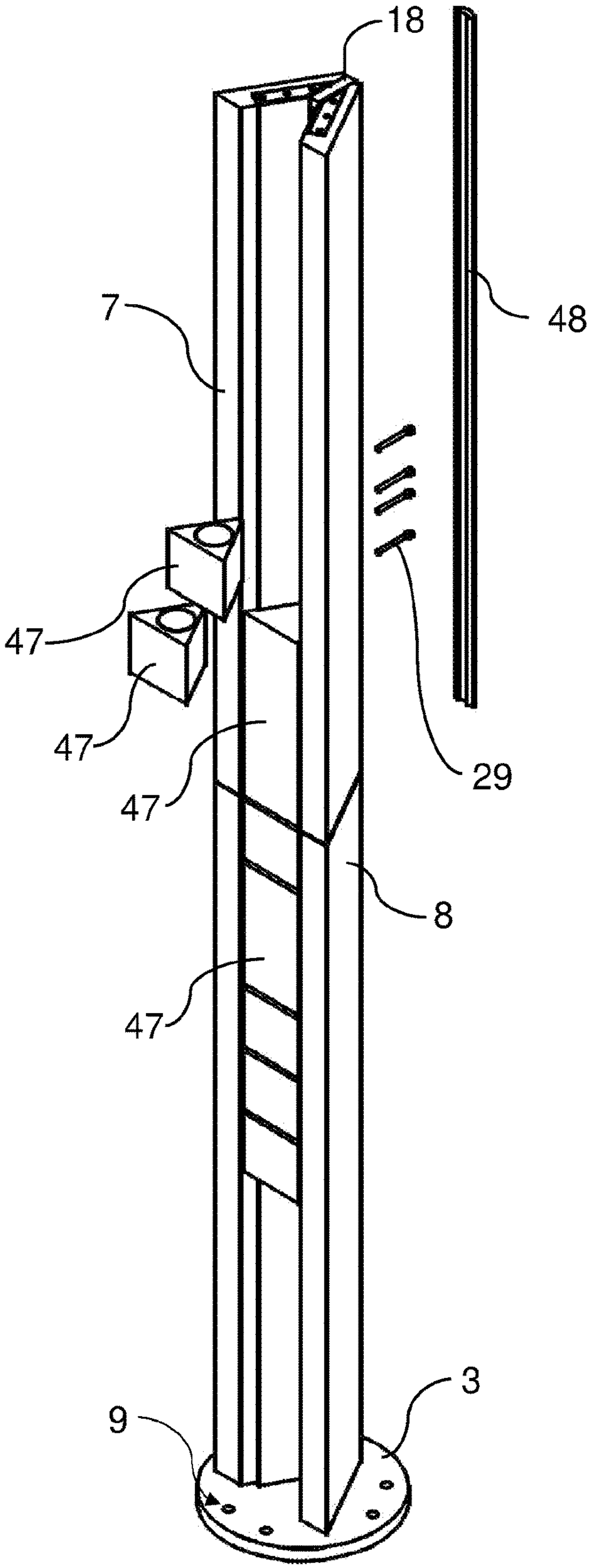
FIG. 10 is an exploded perspective view of the device for storing cremated remains with a detachable backplate according to an embodiment of the present invention.

In such a preferred embodiment illustrated in FIG. 10, different sized urns 47 can be attached to, and detached from, the elongated support or spine 2 in the same fashion as the multiple identical container or urns 4 in FIG. 2. Since the cross-sectional dimensions of said containers or urns of differing length are the same regardless of its vertical lengths, they are independently engaged with the elongated support or spine with light touching, but without weight-bearing mechanical engagement to the lateral wing columns—forming a vertical stack or array 6 along said support. As illustrated, since each container or urn of differing size is individually engaged with the support as per the multiple urns 4 in FIG. 2, they can be attached and detached from the spine without affecting the remaining container or urns in said stack, provided sufficient vertical space to fit the urns are available along the stack. In this embodiment, a back plate 48 is in abutting engagement with the distal width face of the rectilinear member of the elongated support or spine. Said back panel is supported in place by slotting engagement between the two exterior cladding panels 7 and 8 which are attached to the lateral wing columns 19 and 20. The back-plate shields orifices 33 and the embedded threaded bolts 24 from the user's view to maintain a substantially 'clean' or 'unified' aesthetic.

The elongated support or spine can be clad with external cladding or panels to improve both the device's aesthetic qualities and security. These cladding or panels are attached to the elongated support or spine such that they form the exterior of the device at least on multiple faces not in engagement with the containers or urns. Said panels can be attached to the lateral wing column portions of the elongated support using engagement mechanisms including, but not limited to, threaded bolt and nuts, a hook and eye system, an adhesive system, or a combination thereof. The panels can serve to improve the aesthetic qualities of the device by shielding the less aesthetic faces of the load-bearing elongated support, as well as an opportunity to provide a difference in tactile or visual texture compared to both the containers and said elongated support. The less aesthetic faces of the elongated support can comprise bolt holes or hooks used to engage components of the device such as the container and/or even said panels themselves. Further to shielding the less-aesthetic faces, a 'clean' or 'minimal' look can be achieved by unity in visual and tactile texture of the elongated support's exterior surfaces.

Figure 11:
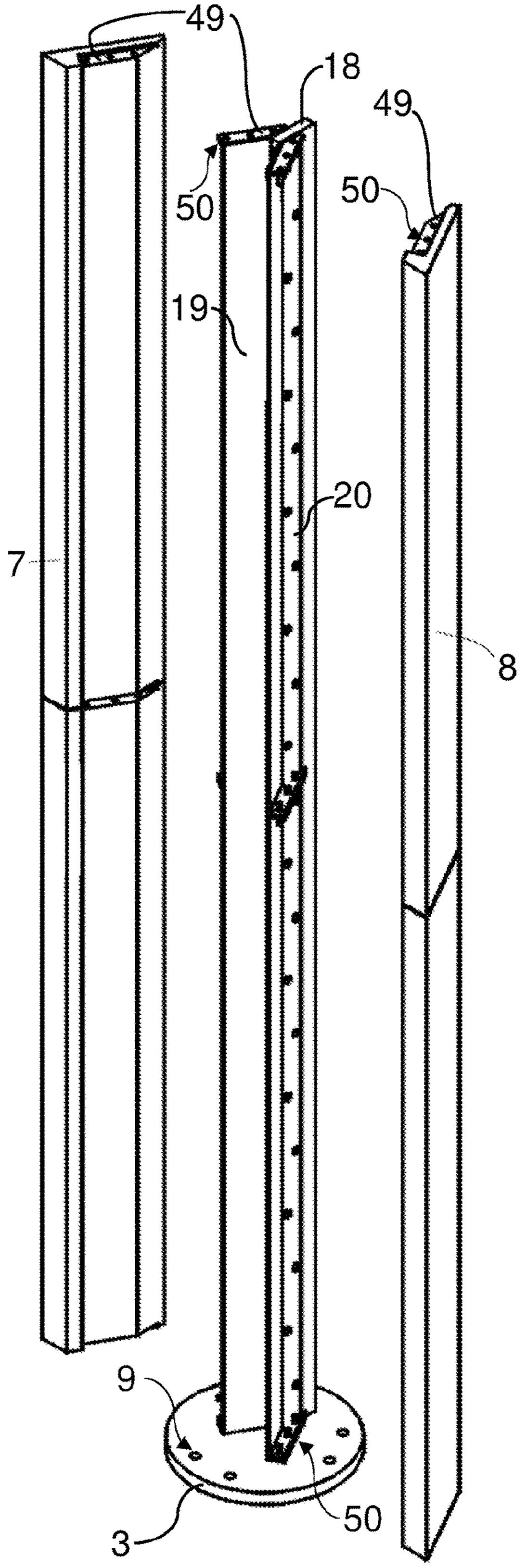
FIG. 11 is an exploded perspective view of the device for storing cremated remains with detachable cladding panels in accordance with yet another embodiment of the present invention.

In an embodiment illustrated in the explosive view of FIG. 11, exterior cladding panels 7 and 8, are attached to the elongated support spine via the attachment brackets 49 provided by both the wing column portion of said support and the panels. The cladding panels are attached by abutting engagement of said brackets, secured by threaded engagement of threaded bolts and/or dowels penetrating holes 50 in said brackets.

The central portion and lateral wings extend from a base which is secured to the ground or the floor structure. Said base can be secured to the ground or floor by bringing them into engagement. Methods of engaging the two include, but are not limited to, piercing, threaded, abutting engagements, or combinations thereof. For example, the base can be secured by bolts partially penetrating the base plate and making contact with embedded tapped threads in the floor or it can make piercing engagement with the floor or ground by a ground screw extending into the ground in an opposite direction to the elongated support or spine. Alternatively, the base can be secured by partially penetrating the base plate with one or more threaded studs extending from the ground or ground structure and securing said base plate by fastening it in place using complementary threaded nuts.

Figure 12:
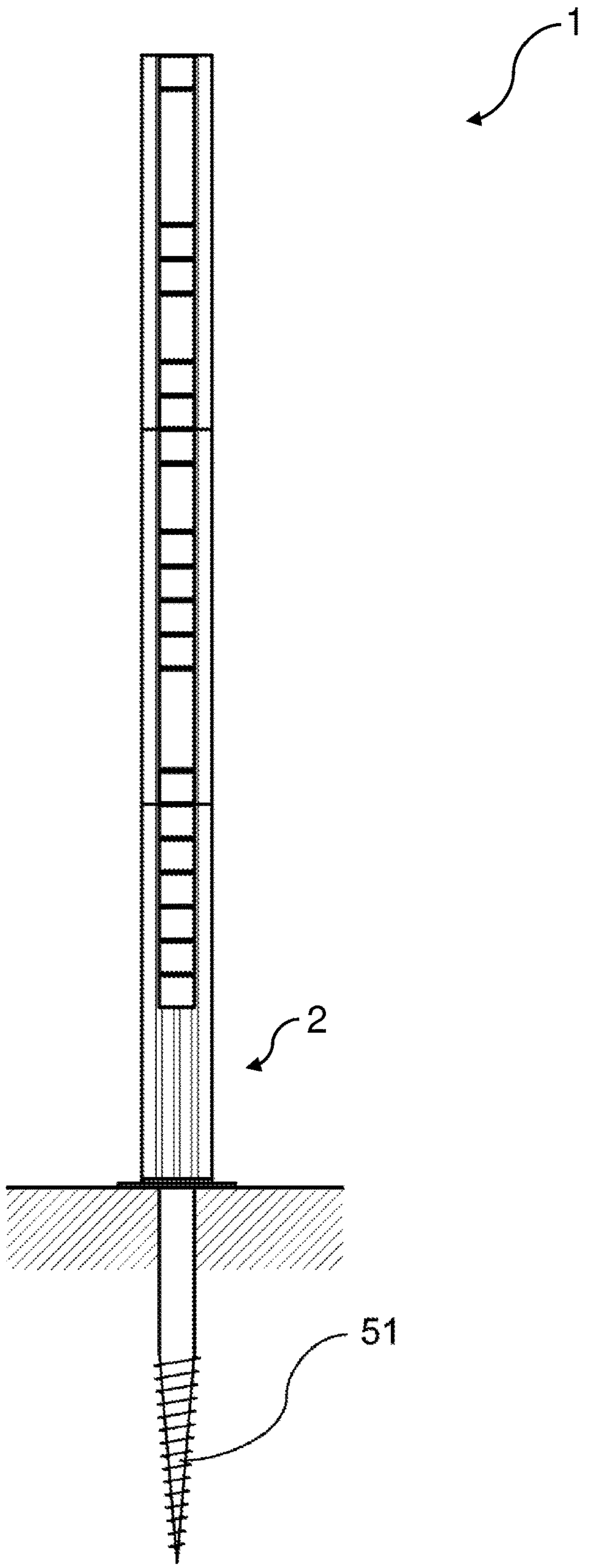
FIG. 12 is a front-on view of the device for storing cremated animal remains secured to the ground in accordance with a further embodiment of the present invention.

In a preferable embodiment illustrated in FIG. 12, the base and thus the device is secured to the ground by piercing engagement between a ground screw 51 extending into the ground from said base.

Overall, the device can be comprised of a plurality of materials, including, but not limited to, metals and/or weather-resistant metals such as structural steel, stainless steel or bronze, and rock and stone masonry including natural and artificial stone, such as sandstone, marble and/or granite. Preferably, the elongated support or spine is comprised of stainless steel 316, the containers or urns are constructed from bronze with welch plugs/caps, similarly formed of bronze, configured for press-fit engagement to form a seal. Similarly, the cladding panels can be comprised of a plurality of materials—preferably marble for the exterior face and stainless steel 316 for the attachment brackets provided.

When storing biological material, preferably the cremated remains of an animal or a human, in an organised manner, it is necessary to track the whereabouts of each animal or individual's remains. This is particularly necessary when storing said remains in areas such a crematorium, a cemetery, a columbarium, a crypt, or a mausoleum, where potentially multiple containers or urns, each containing remains from one or more animals or human individuals, are stored. In order to correctly identify, store and track said remains in such a situation, one or more physical markers or identifiers can be provided by the container and/or the elongated support. Said markers can be cast, etched, stamped into, printed, or otherwise applied onto the containers and/or the elongated support in a position accessible to the user.

Two- or three-dimensional markers such as QR codes, barcodes or physical markings can be used to identify information such as the name and location of the individual human or animal to which the remains relate to. The above information is made available by electronically decoding said markings to obtain a uniform resource locator (URL), name, physical location coordinates—for example, inside a cemetery, an index, a list and/or geographical location tags (a geotag) such as geographical positioning system (GPS) coordinates from a data repository, such as a server. The advantage provided by the markings is that information concerning the remains can be provided to users of the device without physically updating said markings, instead of routing said information from the repository accessible by electronically decoding said markings. In a preferred embodiment, the markers are adapted to be visually discreet, thereby maintaining a simple and unified 'look' for the device.

Preferably, a two- or three-dimensional QR code is stamped into both the bronze urn and the metallic and/or granite elongated support such that when electronically decoded, it provides identifying information via a URL, cemetery coordinate system, index, list and/or geotag from a data repository.

Those skilled in the art will appreciate that the invention described herein is susceptible to variations and modifications other than those specifically described. It is understood that the invention includes all such variations and modifications which fall within the spirit and scope of the present invention.

Future patent applications may be filed in Australia or overseas on the basis of or claiming priority from the present application. It is to be understood that the following provisional claims are provided by way of example only and are not intended to limit the scope of what may be claimed in any such future application. Features may be added to or omitted from the provisional claims at a later date so as to further define or re-define the invention or inventions.

The invention claimed is:

1. A device for storing and memorializing biological remains, consisting essentially of:

a single, central elongated support member comprising substantially a central portion and a lateral portion, wherein the lateral portion comprises two wing columns extending symmetrically outward from opposed elongated faces of the central portion, wherein each of said two wing columns comprises an attachment bracket adapted to engage with an external cladding panel; and a plurality of containers, each container adapted to individually engage directly with said single, central elongated support member while storing said biological remains, wherein said single, central elongated support member and each of the plurality of containers comprise complementary fasteners to directly engage each container with the single, central elongated support member, wherein upon said direct engagement, each container is securely engaged with said single, central elongated support member to form an array of said containers along said single, central elongated support member.

2. A device according to claim 1, wherein each container is adapted to individually engage directly with or disengage from the single, central elongated support member without affecting the engagement of remaining containers in the array.

3. A device according to claim 1, wherein the biological remains comprise cremated animal or human remains.

4. A device according to claim 1, wherein said single, central elongated support member extends upward from a base.

5. A device according to claim 1, wherein said single, central elongated support member is adapted to engage with and support each container such that the weight of each container is supported solely by said single, central elongated support member.

6. A device according to claim 1, wherein each container comprises at least one hollow compartment with at least one orifice opening thereto, each container being sealable to securely carry and store the biological remains.

7. A device according to claim 6, wherein each container is sealable by a cap adapted to substantially isolate the biological remains from the outside environment.

8. A device according to claim 1, wherein the array comprises said containers with at least two different volumes.

9. A device according to claim 7, wherein the two wing columns extend at an angle between 1 and 180 degrees with respect to each other.

10. A device according to claim 1, wherein the single, central elongated support member and the containers are constructed at least partially from a weather-resistant metal.

11. A device according to claim 1, further comprising physical markers adapted to provide a user/viewer, or multiple users/viewers, with information concerning the device or each container and the biological remains stored therein.

12. A device according to claim 11, wherein each physical marker is electronically coded to provide said information from a data repository when decoded by the user/viewer.

13. A device according to claim 1, wherein the complementary fasteners comprise engagement fasteners comprising one or more hooks, bolts, screws, threaded members, magnets, pegs, or dowels; and wherein the complementary fasteners further comprise complementary engagement fasteners comprising one or more hooks, hooking loops, tapped threads, magnets, or dowel recesses.

14. A method of storing and memorializing biological remains, consisting essentially of:

a. providing a single, central elongated support member adapted to receive and support a plurality of containers holding said biological remains, each of said plurality of containers comprising an engagement fastener, wherein said single, central elongated support member comprises:

i. a central portion and a lateral portion, wherein the lateral portion comprises two wing columns extending symmetrically outward from opposed elongated faces of the central portion, wherein each of said two wing columns comprises an attachment bracket adapted to engage with an external cladding panel; and ii. a plurality of complementary engagement fasteners for directly engaging the engagement fastener of each container with the single, central elongated support member;

b. placing each said biological remains inside a respective container; and c. placing each container into independent secure engagement with the single, central elongated support member by directly engaging the engagement fastener of each container with the respective complementary engagement fastener of the single, central elongated support member, wherein upon said direct engagement, each container is securely engaged directly with said single, central elongated support member to form an array of said containers along said single, central elongated support member.

15. A method according to claim 14, wherein each container is engaged directly with or disengaged from the single, central elongated support member without affecting the remaining containers in the array.

16. The method of claim 14 wherein the engagement fasteners comprise one or more hooks, bolts, screws, threaded members, magnets, pegs, or dowels; and the complementary engagement fasteners comprise one or more hooks, hooking loops, tapped threads, magnets, or dowel recesses.

* * * * *